(12) United States Patent
Koguchi

(10) Patent No.: US 7,405,735 B2
(45) Date of Patent: Jul. 29, 2008

(54) TEXTURE UNIT, IMAGE RENDERING APPARATUS AND TEXEL TRANSFER METHOD FOR TRANSFERRING TEXELS IN A BATCH

(75) Inventor: Takahiro Koguchi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 231 days.

(21) Appl. No.: 11/087,075

(22) Filed: Mar. 22, 2005

(65) Prior Publication Data

US 2005/0259104 A1 Nov. 24, 2005

(30) Foreign Application Priority Data

May 19, 2004 (JP) ............................. 2004-149706

(51) Int. Cl.
*G09G 5/00* (2006.01)
(52) U.S. Cl. .................... 345/587; 345/589; 345/582
(58) Field of Classification Search ............ 345/587, 345/589, 582
See application file for complete search history.

(56) References Cited

U.S. PATENT DOCUMENTS

| 5,767,858 | A | | 6/1998 | Kawase et al. | |
|---|---|---|---|---|---|
| 5,877,770 | A | * | 3/1999 | Hanaoka | ...................... 345/587 |
| 7,034,828 | B1 | * | 4/2006 | Drebin et al. | ................ 345/426 |
| 2003/0164838 | A1 | * | 9/2003 | Guo et al. | .................... 345/582 |
| 2005/0088450 | A1 | * | 4/2005 | Chalfin et al. | ................ 345/552 |
| 2006/0202990 | A1 | * | 9/2006 | Barenbrug et al. | ........... 345/426 |

FOREIGN PATENT DOCUMENTS

| JP | 8-212357 | 8/1996 |
|---|---|---|
| JP | 8-320946 | 12/1996 |
| JP | 2003-115056 | 4/2003 |

OTHER PUBLICATIONS

Notification of Reason(s) for Refusal dated Jul. 24, 2007, from the corresponding Japanese Application.
Michael D. McCool, et al., "Texture Shaders", Aug. 8, 1999, pg.(s) 117-126,144, Proceedings 1999 Eurographics / Siggraph Workshop on Graphics Hardware, Los Angeles, CA, U.S., Aug. 8-9, 1999.

(Continued)

*Primary Examiner*—Matthew C. Bella
*Assistant Examiner*—Mike Rahmjoo
(74) *Attorney, Agent, or Firm*—Katten Muchin Rosenman LLP

(57) ABSTRACT

An image rendering apparatus is provided to reduce the amount of data communicated between a shader and a texture unit. The texture unit performs a texture mapping operation for mapping a texture to an object in a three-dimensional space. An input unit receives a single texture address parameter from the shader unit. A coordinate generation unit generates a plurality of texel coordinates based on the texture address parameter. A retrieval unit retrieves a plurality of texel values corresponding respectively to the plurality of generated texel coordinates in a texture cache or in an external texture buffer. An output unit outputs the retrieved texel values to the shader unit in a batch. Since a plurality of texel values are read from a single texture address parameter input, the bandwidth for communications from the shader to the texture unit may be saved.

2 Claims, 7 Drawing Sheets

OTHER PUBLICATIONS

James F. Blinn, et al., "Texture and Reflection in Computer Generated Images", Graphics and Image Processing, October 1976, pg.(s) 542-547, vol. 19, No. 10, Association for Computing Machinery, Inc.

European Search Report and Annex to the European Search report dated Jan. 24, 2008 for corresponding European Application EP 05 00 5992.

* cited by examiner

TEXTURE UNIT, IMAGE RENDERING APPARATUS AND TEXEL TRANSFER METHOD FOR TRANSFERRING TEXELS IN A BATCH

BACKGROUND OF THE INVENTION

1. Field of the Invention

The present invention generally relates to image rendering technology and, more particularly, to a texture mapping technology for mapping textures to the surface of an object.

2. Description of the Related Art

The image processing performed to display a three dimensional (3-D) image on a two dimensional (2-D) screen comprises geometry process and rendering process. In the geometry process, vertex transformation is performed to vertex coordinates of objects constructing 3-D images. In the rendering process, pixel colors are determined based on the geometry data resulting from the geometry process to create a 2-D image.

In the rendering process, color information for each pixel is computed based on both 2-D coordinate location information and textures, which represents color and pattern of the surface of an object. Then the computed result is written in a frame buffer for display on a screen.

For rendering 3-D images at high speed, it is desirable to address the image data at high speed. The texture mapping needs a large number of addressing operations in order to address texels to be mapped to the surface of objects. However, addressing texels one by one over a certain wide area may increase both the number of instructions and the amount of data communicated from a shader to a texture unit. This may cause a shortage in bandwidth between the shader and the texture unit, resulting in a reduction in processing efficiency.

SUMMARY OF THE INVENTION

The present invention has been done in view of problems described above and its object is to provide a technology for reducing the amount of data communicated between the shader and the texture unit.

According to one aspect of the invention, a plurality of texel coordinates are generated based on a single texture address parameter, and then a plurality of texel values corresponding to the texel coordinates are transferred in a batch outside the texture unit.

Thus, a plurality of texel values may be read in response to an input of a single texture address parameter, saving the bandwidth from the shader to the texture unit and improving processing speed. Furthermore, since a plurality of texel values are supplied to the shader in a batch, it is possible to simplify the process on the shader. As used herein, the "texture address parameter" may include texture coordinates, texel coordinates, or LOD values. The "texel value" may include any value such as RGB value, alpha value and Z value of a texel.

It should be noted that applicable aspects of the present invention also include ones in which the expressions of the present invention are replaced among methods, apparatuses, systems, computer programs, recording media containing a computer program, etc.

DETAILED DESCRIPTION OF THE INVENTION

Figure 1:
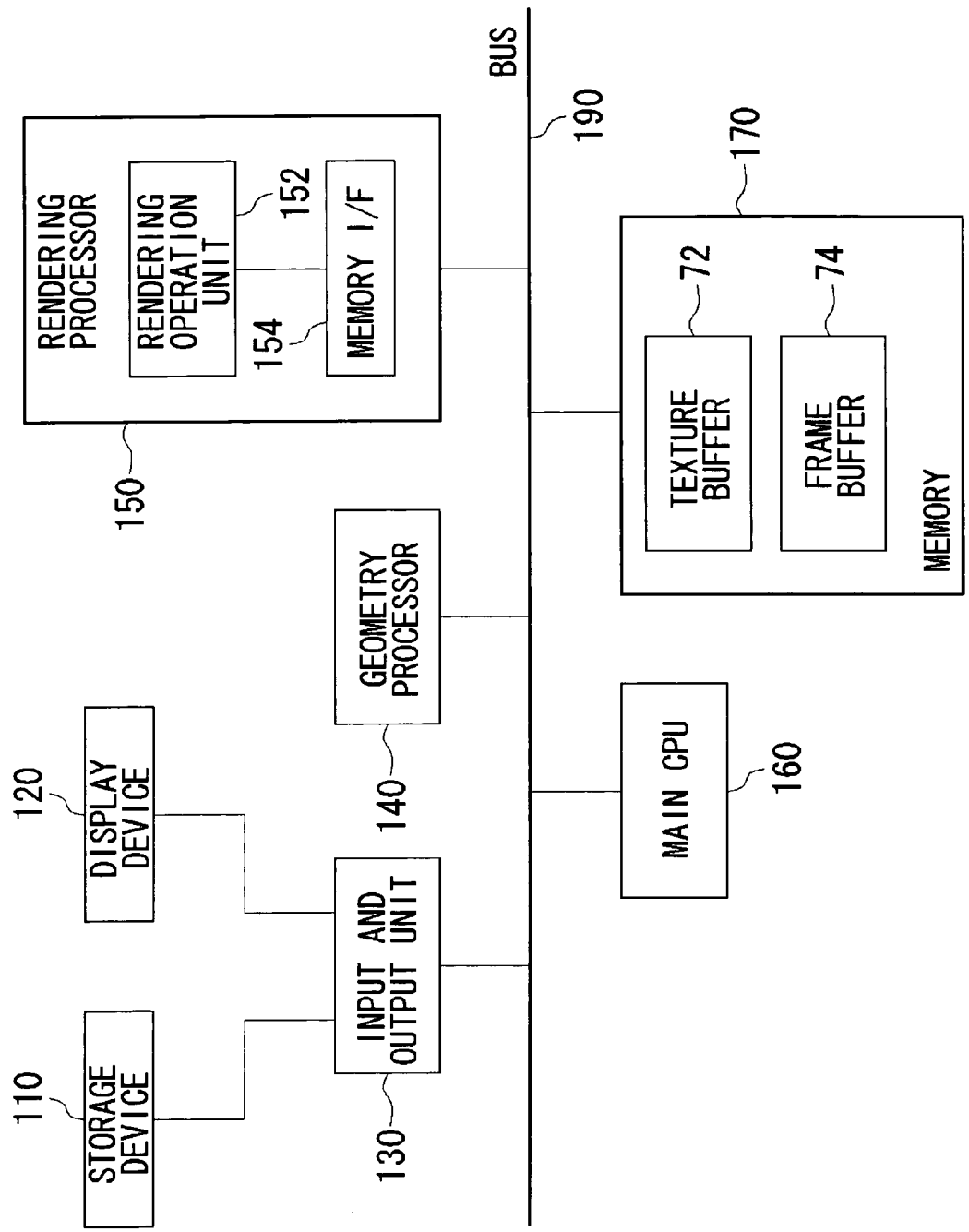
FIG. 1 is a view showing hardware configuration of an image rendering apparatus according to the invention.

FIG. 1 is a view showing hardware configuration of an image rendering apparatus 100 according to an embodiment of the present invention. The image rendering apparatus 100 includes a rendering processor 150 and renders 3-D images to be displayed on the screen of a display device 120 in real time.

The image rendering apparatus 100 comprises an input and output (I/O) unit 130, a geometry processor 140, the rendering processor 150, a main CPU 160, and a memory 170. These blocks are connected to each other via a bus 190 to be able to communicate data therebetween. The I/O unit 130 is connected to a display device 120 and a storage device 110 such as a CD-ROM drive or a hard disc drive. The I/O unit 130 controls input/output of data on the storage device 110 and the display device 120.

The I/O unit 130 reads data or programs for image processing stored in the storage device 110 and then provides them to the geometry processor 140. The data for image processing is, for example, geometry data of objects. The input and output unit 130 may be configured to communicate with other external devices to acquire data and programs for image processing.

The main CPU 160 executes application programs stored in the storage device 110. These programs, when executed, allow the main CPU 160 to control the rendering processor 150 for controlling the image rendering in response to input from a user.

The main CPU 160 also controls the entire process of the image rendering apparatus 100. For example, the main CPU 160 controls data exchange between each of components. For example, under the control of the main CPU 160, geometry data generated by the geometry processor 140 is transferred to the rendering processor 150 using the memory 170 as a buffer. The main CPU 160 also controls synchronous transfer of data between the rendering processor 150 and peripheral devices such as the storage device 110 or the display device 120. In this embodiment, the geometry processor 140 and the main CPU 160 are provided separately. However, the geometry processor 140 and the main CPU 160 may be integrated into one unit and the main CPU 160 may contain the functionality of the geometry processor 140.

The memory 170 stores geometry data of objects and image rendering programs read from the storage device 110. The data of object includes vertex data of polygons constructing the corresponding object. The memory 170 includes a texture buffer 72 for storing texture data used for texture mapping and a frame buffer 74.

Under the control of the main CPU 160, the geometry processor 140 performs geometry process such as affine transformation and vertex lighting processing on the graphics data stored in the memory 170. The geometry data resulting from the geometry processing includes data indicative of the attributes of an object such as vertex coordinates of the object, the texture coordinates of each vertex, and optical intensity at vertices.

The rendering processor 150 includes a rendering operation unit 152 and a memory interface (I/F) 154. Under the control of the main CPU 160, the rendering processor 150 sequentially reads the geometry data generated in the geometry processor 140, and then performs rendering processing on the geometry data to generate image data. RGB value and alpha value, which represents transmittance, of each pixel of the image are stored in a frame buffer 74, while the Z value, which represents the depth of each pixel, is stored in a Z buffer (not shown).

The texture buffer 72, the frame buffer 74, and the Z buffer may also be implemented on the same DRAM (Dynamic Random Access Memory). The DRAM may be implemented in the rendering processor 150.

The image data stored in the frame buffer 74 are read by the I/O unit 130 and then converted into image signal to be displayed on the display device 120.

Figure 2:
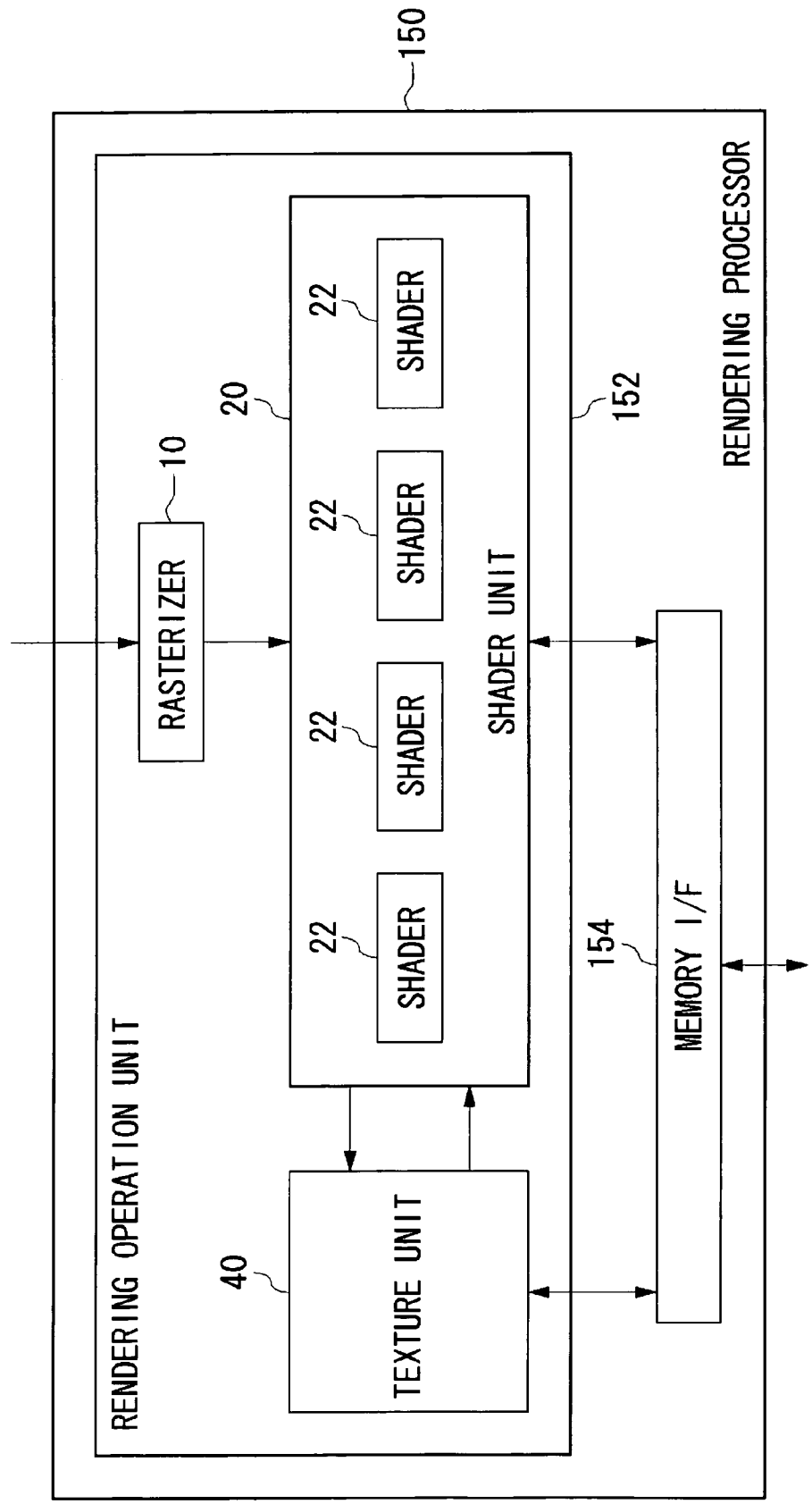
FIG. 2 is a view showing configuration of a rendering processor.

FIG. 2 is a view showing configuration of the rendering processor 150. The rendering operation unit 152 comprises a rasterizer 10, a shader unit 20 and a texture unit 40. The rasterizer 10 receives the geometry data of objects. In general, the objects are triangle strip data. The rasterizer 10 performs view transformation which transforms a triangle in a 3-D space to a triangle on an image plane by projection. The rasterizer 10 then performs rasterization process which converts the triangle on the image plane into pixels quantized by scanning the image plane row by row in the horizontal direction. The rasterizer 10 rasterizes the rendered object to form pixels, and information on each pixel is computed including an RGB value, an alpha value and a Z value.

The rasterizer 10 creates a rectangular pixel region of predetermined dimensions along a scan line and provides the pixel region to the shader unit 20. For parallel rendering process, a plurality of shader units 20 may be provided in the rendering operation unit 152. In this case, an allocation unit (not shown) selects the shader unit 20 for processing the pixel region data supplied from the rasterizer 10 and then stacks the pixel region data on a queue of the selected shader unit 20. The shader unit 20 sequentially processes the pixel region data on the queue.

The shader unit 20 has a plurality of shaders 22 operating asynchronously. Each shader 22 processes corresponding pixel data, enabling to perform the rendering of pixels in parallel.

Each shader 22 in the shader unit 20 performs shading process such as flat shading using the pixel information computed by the rasterizer 10 to determine the color value of each pixel. Each shader 22 then writes the resulting color value into the frame buffer 74 in the memory 170 via the memory interface 154. Each shader 22 is designed to be capable of accessing only a specific area in the memory 170. Each shader 22 blends the pixel color value read from the frame buffer 74 with the color value of texel in accordance with the texture data output from the texture unit 40. Each shader 22 performs fogging or alpha blending to determine the pixel color, the texel color, the alpha value and the fog value for the pixel. Each shader 22 then writes the resulting pixel data to the frame buffer 74 via the memory interface 154. The pixel data written in the frame buffer 74 is read by the input and output unit 130 and output to the display device 120.

The rendering operation unit 152 includes one texture unit 40. Each shader 22 supplies a texture load command to the texture unit 40 and receives texture data after texture mapping from the texture unit 40. The texture load command includes a texture parameter for addressing texture data (hereinafter referred to as a "texture address parameter").

The texture unit 40 receives the texture address parameter from the shader unit 20 and then computes the address of texture data to retrieve the texture cache 50 in the texture unit 40. If no texture data is cached in the texture cache 50, the texture unit 40 retrieves the texture data in the texture buffer 72 in the memory 170 via the memory interface 154. The texture unit 40 performs filtering such as bilinear interpolation or tri-linear interpolation on the retrieved texture data and outputs the result to the shader unit 20.

The shader unit 20 and the texture unit 40 are provided as separate units as shown in FIG. 2 because of the following reason. It is preferable in efficiency that the texture unit is configured in a fixed circuit for frequently rendering process, and it is preferable that the shader unit 20 is designed to have general versatility because its main operations are four fundamental arithmetic operations and logical operations.

Figure 3:
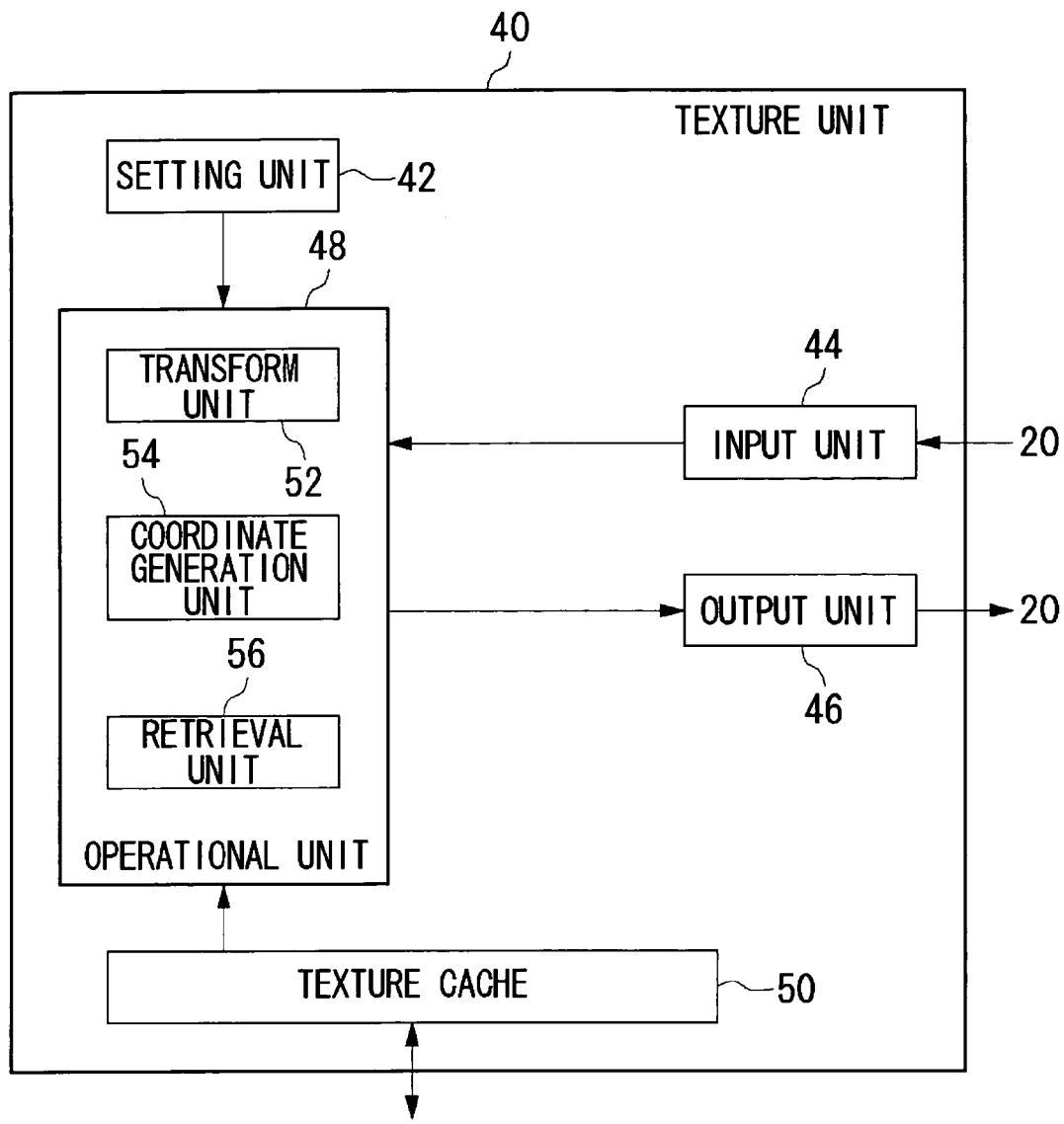
FIG. 3 is a view showing configuration of a texture unit.

FIG. 3 is a view showing configuration of the texture unit 40. Each block shown in FIG. 3 is illustrated as a functional block. Each of these blocks may be implemented as a semiconductor device or as a digital signal processor (DSP) or a graphics processor using computer programs.

The texture unit 40 receives pixel texture coordinates output from the shader unit 20 and transforms the texture coordinates into texel coordinates. Alternatively, the texture unit 40 may receive the texel coordinates directly from the shader unit 20. The texture unit 40 may receive LOD values indicative of the level of detail of the texel in addition to the texel coordinates. Then, the texture unit 40 computes the address of the texture data using the texel coordinates. Using the address, the texture unit 40 reads the texel values and then determines the color of texels to be mapped to pixels through filtering such as bilinear filtering.

Now, each block in the texture unit 40 will be described. A setting unit 42 is implemented as registers or the like and is supplied various setting information for specifying the operation of the texture unit 40. The texture unit 40 generates texture data through the filtering operation specified by the setting information in the setting unit 42.

An input unit 44 receives texture load commands from the shaders 22 and stacks the commands. The texture load command contains a texture parameter that specifies texture data. The texture parameter may include texture coordinates, texel coordinates, LOD (level of detail) value, or the like.

The texture coordinates and texel coordinates are two-dimensional coordinates, wherein the texture coordinates are represented as (s, t) and the texel coordinates are represented as (u, v). Which coordinate system is used may be specified in the setting information in the setting unit 42.

The texture load commands stacked in the input unit 44 are read sequentially and processed in an operational unit 48.

A transform unit 52 in the operational unit 48 transforms 2-D texture coordinates (s, t) to 2-D texel coordinates (u, v) using the size of each texture according to the following equation;

$$u = s \times \text{TexWidth} \quad (1)$$

$$v = t \times \text{TexHeight} \quad (2)$$

where TexWidth and TexHeight correspond to the width and height of a texture, respectively.

A coordinate generation unit 54 generates addresses in the texture buffer 72 using texel coordinates. A retrieval unit 56 accesses a texture cache 50 in the texture unit 40 using the addresses. In the texture cache 50, texture data read from the storage device 110 is cached.

When an attempt to read texture data in the texture cache 50 ends in failure, the retrieval unit 56 accesses the texture buffer 72 in the memory 170 via the memory interface 154. When no texture data is found in the texture buffer 72, the retrieval unit 56 accesses the storage device 110 via the I/O unit 130. The texture data read from either the texture buffer 72 or the storage device 110 is provided to the texture unit 40 via the bus 190.

The operational unit 48 performs filtering operations such as bilinear interpolation on texel values in accordance with the setting information in the setting unit 42 then transfers the result to an output unit 46. The data stacked in the output unit 46 is passed to the shaders 22 in sequence.

The texture data may be designed not to have the direct color value of each texture but to have the index of a color value. This allows for efficient compression of texture data. The information on the color values associated with the index values are stored in a lookup table (not shown). As used herein, the lookup table stores a color table in which entries indicative of the color information are listed in the order of the index numbers.

In this case, the operational unit 48 provides the index value to a lookup table reference unit (not shown) in order to transform the texel color given in the index form to an actual color value. The lookup table reference unit refers to the lookup table using the index value to output the color information associated with the index value to the operational unit 48.

As described above, the rendering processor 150 according to this embodiment has the texture unit 40 independent of the shader unit 20 including a plurality of shaders 22. Thus, since one texture unit is provided for a plurality of shaders, the computing load on the shaders is reduced and the operating ratio of the texture unit is improved. Therefore, the overall efficiency of the rendering processor 150 is also improved. Additionally, the data output from the texture unit 40 may be processed in the shaders 22 in various ways.

This arrangement, however, would require frequent data communications between the shader unit 20 and the texture unit 40. So, It is one of the critical issues to reduce a traffic volume of data communication.

To solve the issue, two or four texel values are transferred in a batch to the shader unit 20 in response to the texture load command having a single texture address parameter according to this embodiment. Thereby a traffic volume of data communication between the shader unit 20 and the texture unit 40 may be reduced.

Figure 4:
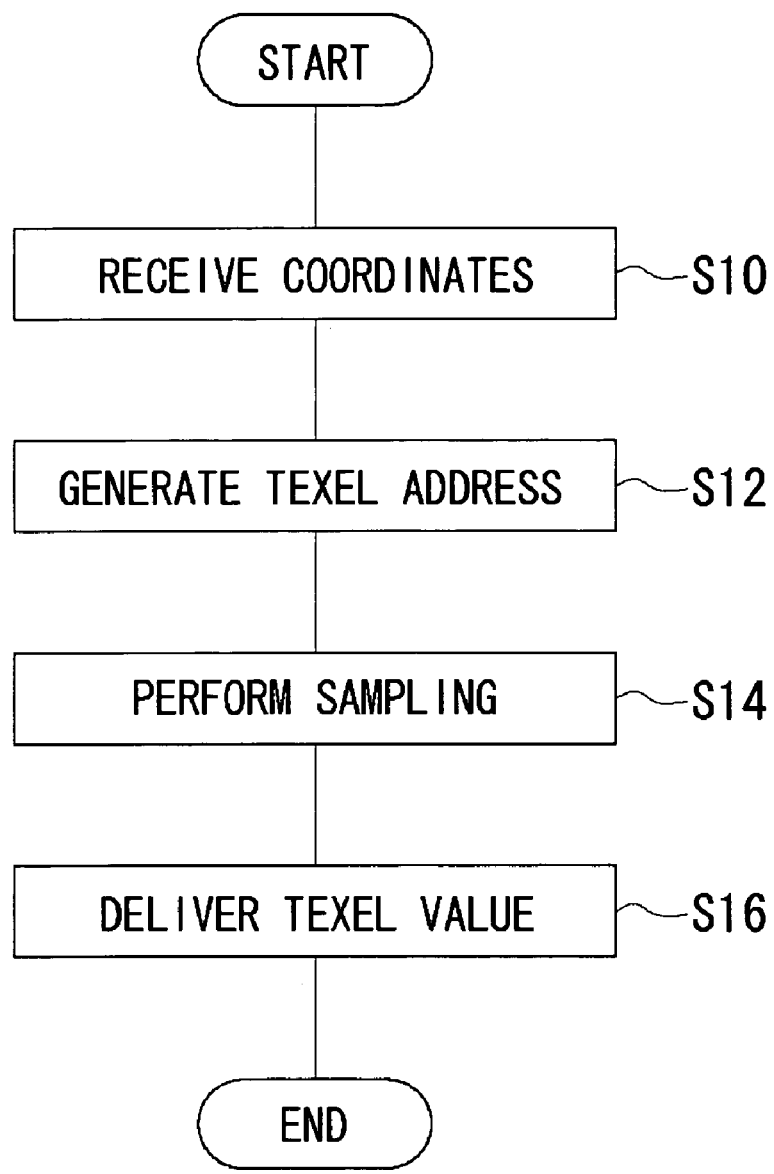
FIG. 4 is a flowchart showing a batch transfer operation of adjacent texels.

FIG. 4 is a flowchart showing a batch transfer operation of adjacent texels. The input unit 44 in the texture unit 40 receives a single texture address parameter from the shader unit 20. More specifically, the texture unit 40 receives 2-D texture coordinates, texel coordinates, or an LOD value (S10). When the input unit 44 receives texture coordinates, the transform unit 52 transforms the texture coordinates to the texel coordinates according to the equation (1) and (2). Then, the coordinate generation unit 54 generates a plurality of texel coordinates using the texture address parameter (S12). The retrieval unit 56 retrieves texel values (for example, the color value, alpha value, and Z value) from the texture cache 50 corresponding to the plurality of the texel coordinates (S14). As described above, in the case of cache miss, the retrieval unit 56 accesses the texture buffer 72 or the storage device 110. The retrieved texel value is then output to the shader unit 20 via the output unit 46 (S16).

In accordance with this flowchart, Examples 1 to 4 described below can be realized. These Examples will be discussed with a case using 2-D textures.

EXAMPLE 1

Batch Transfer of Four Adjacent Texels

In this example, four texel coordinates are generated in response to the input of one texture address parameter to select four adjacent texels. In the case that one texel is comprised of four components R, G, B and A, any one of the R, G, B and A components among the texel values of the selected four texels are transferred to the shader unit 20 in a batch.

On receiving 2-D texel coordinates (u, v), the coordinate generation unit 54 generates the following four texel coordinates:

$$(\text{floor}(u-0.5), \text{floor}(v-0.5)) \quad (3)$$

$$(\text{floor}(u-0.5), \text{floor}(v-0.5)+1) \quad (4)$$

$$(\text{floor}(u-0.5)+1, \text{floor}(v-0.5)) \quad (5)$$

$$(\text{floor}(u-0.5)+1, \text{floor}(v-0.5)+1) \quad (6)$$

where the function "floor" returns a center of a texel that is closest to the argument.

Figure 5:
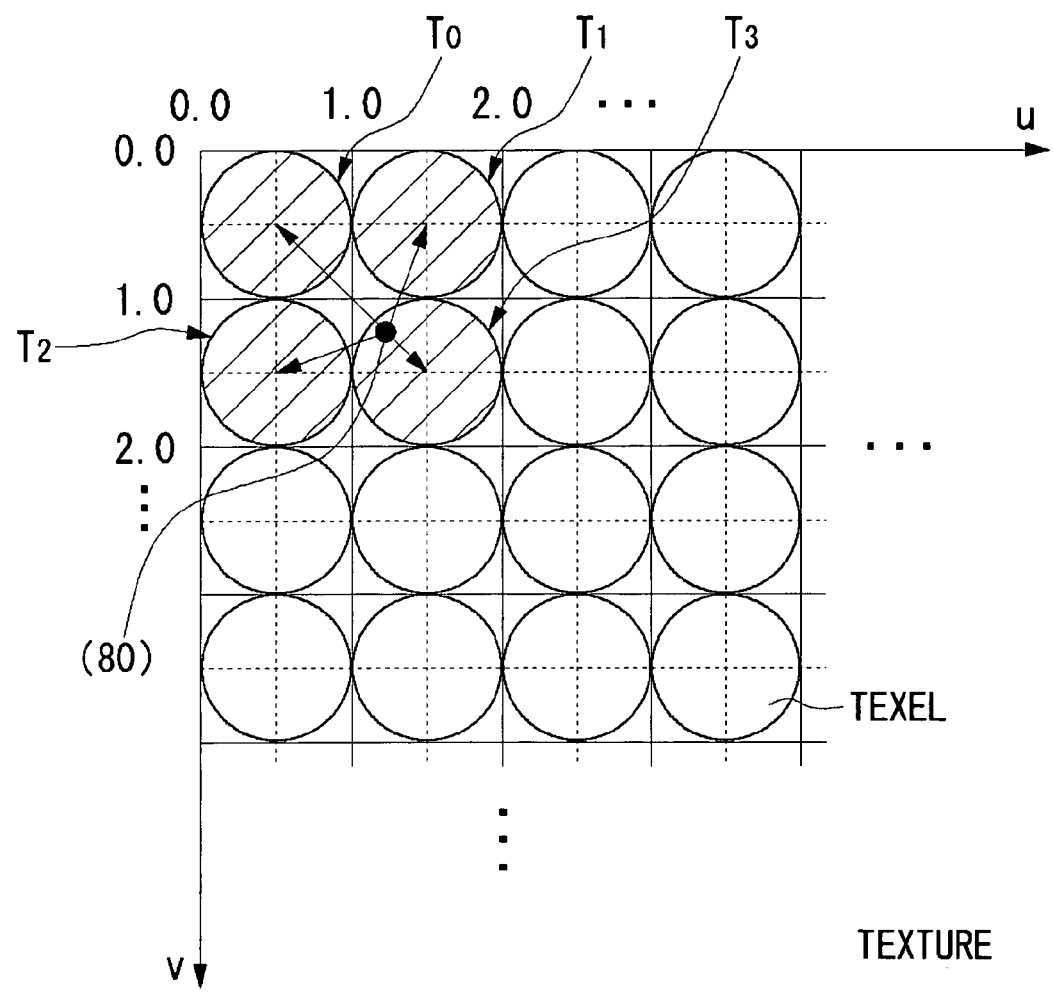
FIG. 5 is an explanatory view showing how to address four adjacent texels to be transferred in a batch.

Now, addressing texels in the texture cache 50 will be described referring to FIG. 5. FIG. 5 is an explanatory view showing how to address four adjacent texels to be transferred in a batch. Texels in a texture are addressed in a 2-D texel coordinate system. The vertical and horizontal width of one texel is "1.0" respectively. The center of each texel is placed at texel coordinates having a decimal of 0.5, which is a center of each grid shown in FIG. 5. By specifying this texel coordinates, it is possible to get an actual address in the texture cache 50.

A dot 80 in FIG. 5 indicates texel coordinates (u, v) received directly from the shaders 22 or transformed from texture coordinates. Using this texel coordinates (u, v), the coordinate generation unit 54 generates the four texel coordinates shown by equations (3) to (6) described above. These four coordinates correspond to the center coordinates of each texel indicated as $T_0$ to $T_3$ in FIG. 5. For example, suppose that the texel coordinates (u, v) of the dot 80 is (1.2, 1.2). In this case, the coordinate generation unit 54 substitutes the coordinates into equation (3) to yield the texel coordinates of (0.5, 0.5) (that is, (floor(1.2−0.5), floor(1.2−0.5))=(floor(0.7), floor(0.7))=(0.5, 0.5)). The retrieval unit 56 retrieves the address of texel $T_0$ having its center at the coordinates (0.5, 0.5) to acquire a texel value. Likewise, the coordinate generation unit 54 generates the texel coordinates; (floor(1.2−0.5)+1, floor(1.2−0.5))=(floor(0.7)+1; floor(0.7))=(1.5, 0.5) from equation (4); (floor(1.2−0.5), floor(1.2−0.5)+1)=(floor (0.7), floor(0.7)+1)=(0.5, 1.5) from equation (5); and (floor (1.2−0.5)+1, floor(1.2−0.5)+1)=(floor(0.7)+1, floor(0.7)+1)=(1.5, 1.5) from equation (6). The retrieval unit 56 retrieves addresses of texels $T_1$ to $T_3$ having their centers at these coordinates (1.5, 0.5), (0.5, 1.5), (1.5, 1.5) to acquire texel values.

Conventionally, in order to acquire components for four texels, texel addresses would be specified one by one and then the retrieval of one texel value would be repeated four times. In contrast, one addressing is needed to transfer the texel values of four texels to the shader unit 20 in a batch according to the embodiment. This makes it possible to reduce the traffic needed for addressing from the shader unit 20 to the texture unit 40 to ¼ of the traffic of data required when using conventional art. Furthermore, four texel values are outputted in a batch in response to one texture load command, thereby allowing the shaders to save the number of executions of programs. It is thus possible to improve process efficiency when compared with the case where texels are specified one by one.

EXAMPLE 2

Batch Transfer of Two Adjacent Texels

In this example, two texel coordinates are generated in response to the input of one texture address parameter. In this example, "up-mode" or "down-mode" may be specified depending on whether the upper or lower position of texels should be selected in the texel coordinate system in accordance with the texel coordinates.

When the up-mode is specified, the coordinate generation unit 54 receives 2-D texel coordinates (u, v) to generate the following two texel coordinates.

$$(floor(u-0.5), floor(v-0.5)) \quad (7)$$

$$(floor(u-0.5)+1, floor(v-0.5)) \quad (8)$$

When the down-mode is specified, the coordinate generation unit 54 receives 2-D texel coordinates (u, v) to generate the following two texel coordinates.

$$(floor(u-0.5), floor(v-0.5)+1) \quad (9)$$

$$(floor(u-0.5)+1, floor(v-0.5)+1) \quad (10)$$

Figure 6A:
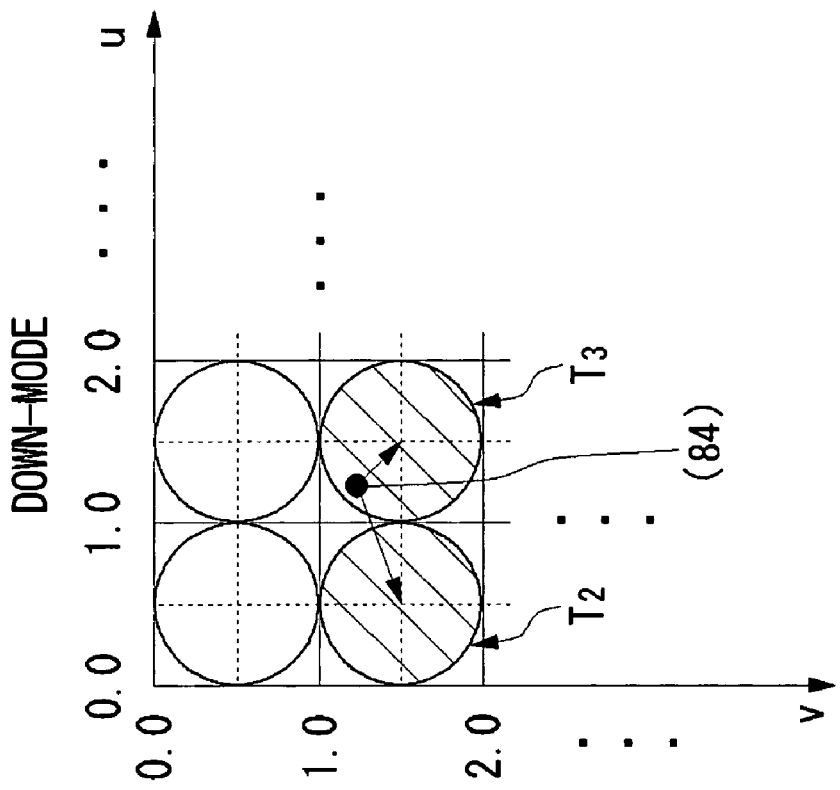
FIG. 6A is an explanatory view showing how to address two adjacent texels to be transferred in a batch when up-mode is specified.
Figure 6B:
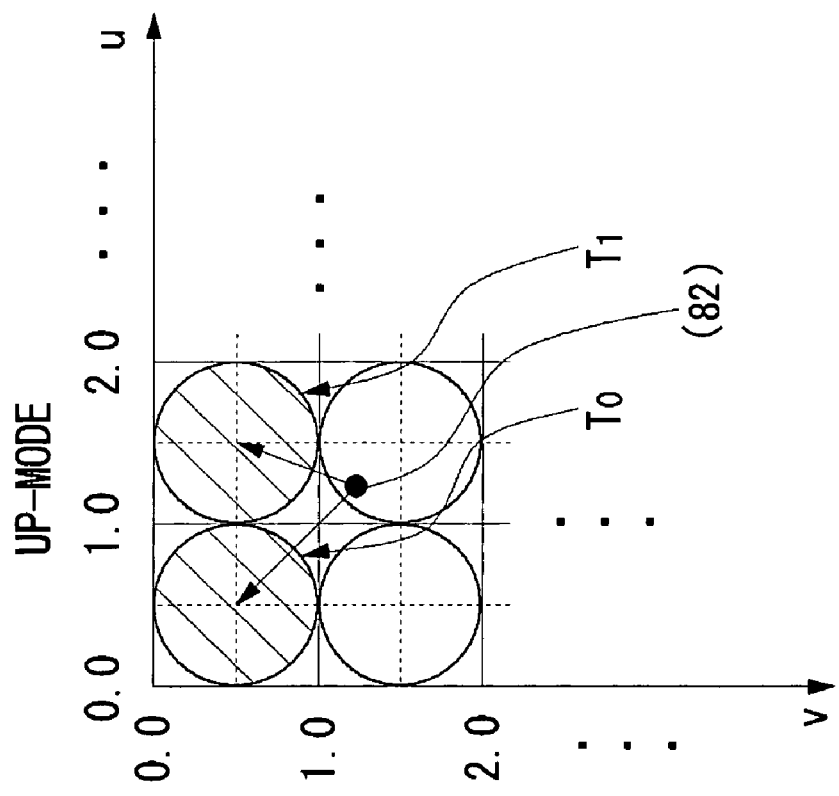
FIG. 6B is an explanatory view showing how to address two adjacent texels to be transferred in a batch when down-mode is specified.

FIGS. 6A and 6B are explanatory views showing how to address two adjacent texels in the texture cache 50. The texel coordinate system shown in FIGS. 6A and 6B is same with the system in FIG. 5. FIG. 6A illustrates the address of texels when up-mode is specified. The coordinate generation unit 54 generates two texel coordinates (0.5, 0.5) and (1.5, 0.5) using equations (7) and (8) in accordance with the texel coordinates (u, v) indicated by dot 82. The retrieval unit 56 retrieves the addresses of two corresponding texels $T_0$ and $T_1$ having their centers at these texel coordinates (0.5, 0.5), (1.5, 0.5) to acquire their texel values. FIG. 6B illustrates the address of texels when down-mode is specified. The coordinate generation unit 54 generates two texel coordinates (0.5, 1.5) and (1.5, 1.5) using equations (9) and (10) in accordance with the texel coordinates (u, v) indicated by dot 84. The retrieval unit 56 retrieves the addresses of two corresponding texels $T_2$ and $T_3$ having their centers at these texel coordinates (0.5, 1.5), (1.5, 1.5) to acquire their texel values.

As can be seen from FIG. 6A, the texel coordinates generated from equations (7) and (8) are same with those generated from equations (3) and (4) used by the batch transfer of four adjacent texels. As can be seen from the FIG. 6B, the texel coordinates generated from equations (9) and (10) are same with those generated from equations (5) and (6) used by the batch transfer of four adjacent texels. Accordingly, when the up-mode and the down-mode are executed successively, the texel values of the four adjacent texels at the input texel coordinates are transferred from the texture unit 40 to the shader unit 20, which is same result as in the transfer of four adjacent texels.

The batch transfer of two adjacent texels according to the Example 2 provides a drop by one half in throughput when compared with the batch transfer of four adjacent texels according to Example 1. The batch transfer of four adjacent texels of the Example 1 or the batch transfer of two adjacent texels of the Example 2 may be selected depending on the hardware configuration such as the bus width between the shader unit 20 and the texture unit 40 or subsequent process in the shaders 22. That is, the batch transfer of two adjacent texels would be selected when the bus width between the texture unit 40 and the shader unit 20 is just more than twice the number of bits of texel component. The selection of these two transfer is made in accordance with the setting information in the setting unit 42.

EXAMPLE 3

Transfer of Two Component Texels

In this example, data transfer of texel values will be described when the number of bits of the entire texel value (e.g., 64 bits) is larger than the bus width between the texture unit 40 and the shader unit 20 (e.g., 32 bits).

For example, suppose that R, G, B and A components of one texel have 16 bits respectively and thus total bits of the texel is 64 bits, and the bus width between the texture unit 40 and the shader unit 20 is 32 bits. In this case, all the texel values of one texel are transferred in two components each time to the shader unit 20. Two components of the texel, R and G values, are transferred in RG mode, and the remaining two components of the texel, B and A values, are transferred in BA mode.

It would be appreciated that the Example 3 may also take other various forms depending on the hardware configuration of the rendering processor 150.

EXAMPLE 4

Figure 7:
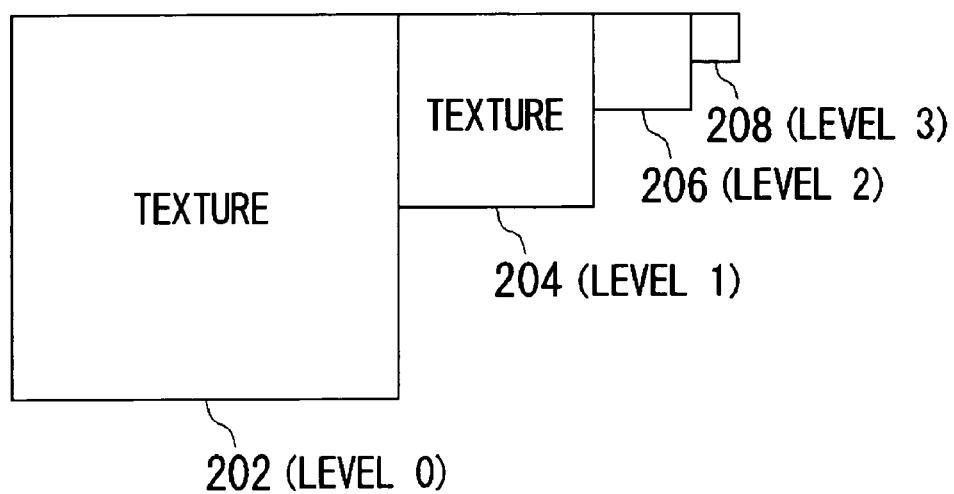
FIG. 7 is an explanatory view showing the structure of mipmap textures.

Now, a description will be given to texture address parameters including LOD values in Examples 1 to 3. FIG. 7 is an explanatory view showing the structure of a mipmap texture 200. The mipmap texture is a sequence of textures, each of which is pre-filtered to have a progressively lower resolution level. For example, FIG. 7 shows the structure of the mipmap textures having a texture 202 at level 0, a texture 204 at level 1, a texture 206 at level 2, and a texture 208 at level 3, each of which has a progressively lower resolution in that order.

The coordinate generation unit 54 selects any one of the textures at levels 0 to 3 based on the LOD value. Then in the selected texture, the coordinate generation unit 54 generates texel coordinates in accordance with the texture coordinates (s, t) or the texel coordinates (u, v). The retrieval unit 56 retrieves the addresses of texels having their centers at these texel coordinates. For example, on receiving a texture address parameter including texel coordinates (u, v) and an LOD value in the batch transfer of four adjacent texels according to the Example 1, the coordinate generation unit 54 generates the following four texel coordinates.

$$(floor(u'-0.5), floor(v'0.5)) \quad (11)$$

$$(floor(u'-0.5), floor(v'-0.5)+1) \quad (12)$$

$$(floor(u'-0.5)+1, floor(v'-0.5)) \quad (13)$$

$$(floor(u'-0.5)+1, floor(v'-0.5)+1) \quad (14)$$

where (u', v') represents texel coordinates (u, v) on a level of texture selected based on the LOD value. For the batch transfer of two adjacent texels, the coordinate generation unit 54 generates any two texel coordinates of equations (11) to (14).

As described above, the batch transfer of adjacent texels according to this embodiment makes it possible to reduce the amount of data communicated from the shader unit 20 to the texture unit 40, thereby saving the bandwidth between the shader unit 20 and the texture unit 40. This embodiment is useful particularly in transferring one component of multiple texels, for example, when a plurality of values are summed and averaged in image processing or when alpha values of an entire texture are used for computation as in the alpha blending.

Furthermore, the data stored in a particular area in the memory 170 to which only a certain shader 22 is allowed to access may also be transferred to other shaders 22 via the texture unit 40 according to the embodiment.

The present invention has been described with reference to the embodiments. However, those skilled in the art will appreciate that the embodiment is only illustrative of the invention and thus various modifications can be made to each components or process without departing from the scope of the present invention. Now, such modifications will be discussed below.

The present invention is also applicable to data such as Z values or vector data stored in the texture buffer that are not directly associated with textures.

By way of example, the batch transfer of adjacent texels according to the invention may be applied to shadow mapping. The "shadow mapping" is a technique for generating shadow information through the projection of a texture. For example, the shadow mapping makes it possible to accurately represent the shadow of an object illuminated with a source of light when the light source moves, thereby enhancing the reality of the image.

Now, the procedure of the shadow mapping will be described when the present invention is applied. Z values from the viewpoint of the light source are stored in the texture buffer. This buffer is referred to as a "shadow map." When the shader renders a pixel viewed from the viewpoint of an observer, the shader compares the "distance between the pixel and the light source" and "a value referred from the shadow map", and then determines whether that pixel is in the shadow or not when viewed from the light source. If the value of the shadow map is greater than the distance between the pixel and the light source, the shader determines that pixel is in the shadow and then performs shading. This determination and shading are repeated by the number of light sources.

In the foregoing determination, the batch transfer of four adjacent texels is used to transfer the texel values of the four adjacent texels as the value of the shadow map being referred as a texture. The shader compares the interpolated values of the four texel values with the distance from the light source to perform shading according to the comparison results. Using the interpolated values may reduce the aliasing of the shadow. Generally, the aliasing of the shadow also may be reduced by enhancing the resolution of the Z buffer. However, when the memory capacity is a critical issue, this technique is effective because anti-aliasing is achieved mainly by calculation.

Since the number of shadow maps increases as the increase of the light sources, calculation load on the entire system becomes substantially heavy. In contrast, a plurality of Z values may be collected only by one addressing operation, so the calculation loads may be reduced.

Although the batch transfer of four adjacent texels and two adjacent texels have been described with reference to the embodiments, the number of texel values to be transferred in response to one texture load command is not limited to two or four. Suppose three-dimensional layer textures are available in texture mapping process. The transform unit may transfer the texel values in a plurality of texture layers in a batch by tri-linear sampling.

What is claimed is:

1. A texture unit performing a texture mapping operation to map a texture to an object in a three-dimensional space, comprising:
    a memory storing a texture formed of a plurality of texels;
    an input unit receiving a single texture address parameter from outside the texture unit;
    a coordinate generation unit generating a plurality of texel coordinates based on said single texture address parameter;
    a retrieval unit retrieving from said memory a plurality of texel values corresponding respectively to said plurality of texel coordinates; and
    an output unit outputting said plurality of texel values to outside the texture unit,
    wherein when said texel value retrieved by said retrieval unit has an amount of data greater than or equal to an output bit width from the texture unit, part of said data is first transferred and successively the remainder of said data is transferred.

2. An image rendering apparatus comprising a texture unit and a shader unit, said texture unit performing a texture mapping operation to map a texture to an object in a three-dimensional space and said shader unit receiving texel values to determine a final rendering color, said texture unit comprising:
    a memory storing a texture formed of a plurality of texels;
    an input unit receiving a single texture address parameter from said shader unit;
    a coordinate generation unit generating a plurality of texel coordinates based on said single texture address parameter;
    a retrieval unit retrieving from said memory a plurality of texel values corresponding respectively to said plurality of texel coordinates, and
    an output unit outputting said plurality of texel values to said shader unit,
    wherein when said texel value retrieved by said retrieval unit has an amount of data greater than or equal to an output bit width from the texture unit, part of said data is first transferred and successively the remainder of said data is transferred.

* * * * *